United States Patent [19]
Ridpath

[11] 3,790,932
[45] Feb. 5, 1974

[54] VISUAL BRAKING WARNING DEVICE FOR LAND VEHICLES

[75] Inventor: Jeffrey David Ridpath, Severn Bridge, Ontario, Canada

[73] Assignee: Shakespeare Company, Columbia, S.C.

[22] Filed: June 30, 1972

[21] Appl. No.: 268,084

[30] Foreign Application Priority Data
Jan. 14, 1972 Canada.............................. 132,438

[52] U.S. Cl...................... 340/62, 340/71, 340/262
[51] Int. Cl............................................... B60q 1/54
[58] Field of Search............ 340/53, 62, 66, 71, 262

[56] References Cited
UNITED STATES PATENTS

| | | | |
|---|---|---|---|
| 3,631,390 | 12/1971 | Murphy | 340/263 X |
| 3,639,896 | 12/1972 | Bozoian | 340/62 |
| 3,603,878 | 9/1971 | Himmelstein | 340/263 X |

*Primary Examiner*—Alvin H. Waring
*Attorney, Agent, or Firm*—Hamilton, Renner & Kenner

[57] ABSTRACT

A visual braking warning system for land vehicles, particularly snowmobiles and the like, includes an electrical signal generating means which produces a signal that varies in accordance with the speed of an engine driving the vehicle, measuring means arranged to measure and control the signal from the signal generating means, and means arranged to provide a visual warning to following vehicles when the engine speed is shown by the measuring means to have fallen below a predetermined speed.

10 Claims, 5 Drawing Figures

FIG. I.

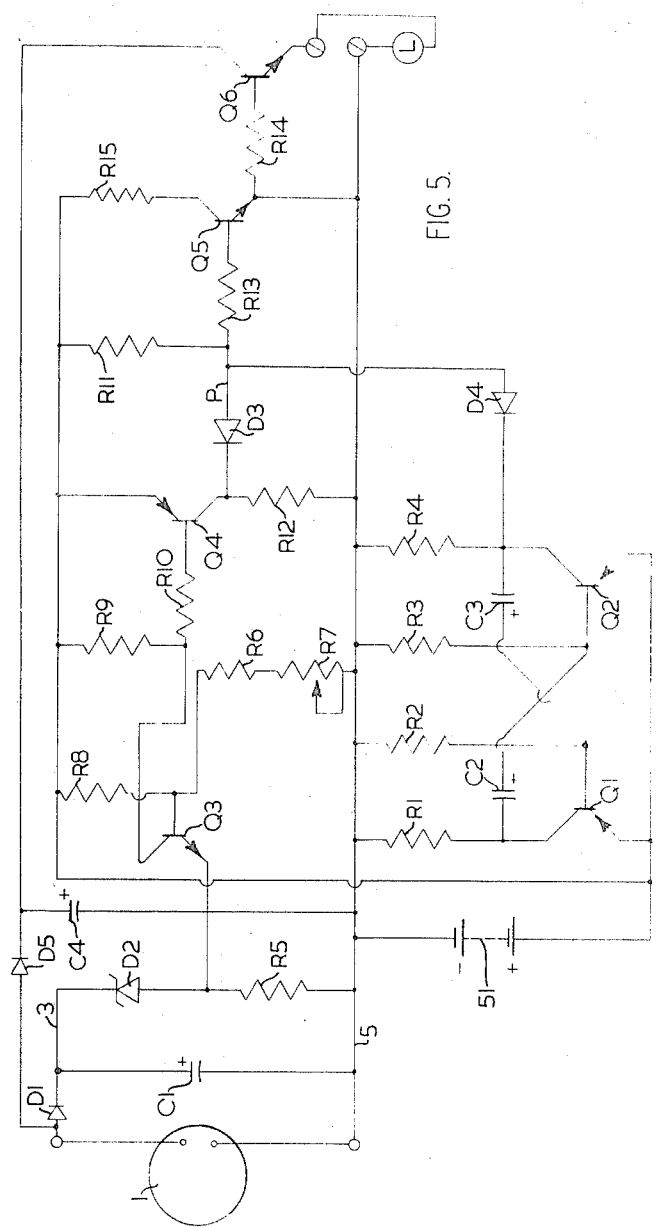

VISUAL BRAKING WARNING DEVICE FOR LAND VEHICLES

BACKGROUND OF THE INVENTION

This invention relates to improved warning devices for use on motor vehicles, and although it finds particular application to snowmobiles which will be described herein as typical, it can be applied with advantage to other vehicles.

Braking of snowmobiles is usually effected by engine braking, which is produced when the vehicle speed is greater than that which would normally be produced by the instantaneous setting of the throttle (i.e., accelerator or gas pedal), even although some form of mechanical brake is often provided. There is no equivalent to the braking light found (and required by law) on all road motor vehicles. Arising from the combination of the use of the engine as a brake and the lack of a braking light, if one snowmobile is following a first snowmobile, and the driver of the first snowmobile closes his throttle, then his vehicle will brake down to a lower speed, or come to a halt, at a rate determined by the sum of the braking produced by his engine and the frictional drag on the machine, which is considerable for a snowmobile in which a wide cleated belt serves as the snow-engaging drive means. The following snowmobile has a maximum braking effort which is only about as great as the normal braking effort of the vehicle in front, and it follows that unless the first snowmobile driver is very careful in decreasing speed, the following snowmobile may not be able to stop in time.

Although a somewhat similar situation can arise in wheeled road vehicles, the situation is not as severe, since if a leading driver releases his gas pedal and slows down, the following driver has available to him the additional braking effort of his wheel brakes, and in most cases this is ample to meet the situation where the leading driver merely slows by engine braking.

SUMMARY OF THE INVENTION

It is thus a primary object of the present invention to provide an electronic device which will afford a visual warning when a vehicle is braking or slowing down.

It is another object of the present invention, as above, to provide a vehicle, such as a snowmobile, with an electronic visual warning device which is actuated when the speed of the vehicle falls below a predetermined rate.

These and other objects which will become apparent from the following specification are accomplished by the improvements hereinafter described and claimed.

In general, an electrical signal generator, which can be in the form of a tachometer generator, is arranged to produce a signal which varies in accordance with the speed of an engine driving a land vehicle such as a snowmobile. Measuring circuitry or control means detect and gate the signal from the signal generator according to a preselected speed so that a warning means may be selectively activated to provide a visual warning to following vehicles when the engine speed is shown by the measuring circuitry means to have fallen below the predetermined speed. In the preferred embodiment, the measuring circuitry means selectively permits a signal from a flasher unit, in the form of a multivibrator, to flash the light below the predetermined speed.

A preferred embodiment of the present invention is shown by way of example in the accompanying drawings and is hereinafter described in detail without attempting to show all of the various forms and modifications in which the invention might be embodied, the invention being measured by the appended claims and not the details of the specification.

BRIEF DESCRIPTION OF THE DRAWINGS

FIG. 5 is a circuit diagram similar to that of FIG. 2 but modified to provide an alternative form of warning signal.

DESCRIPTION OF THE PREFERRED EMBODIMENT

Figure 1:
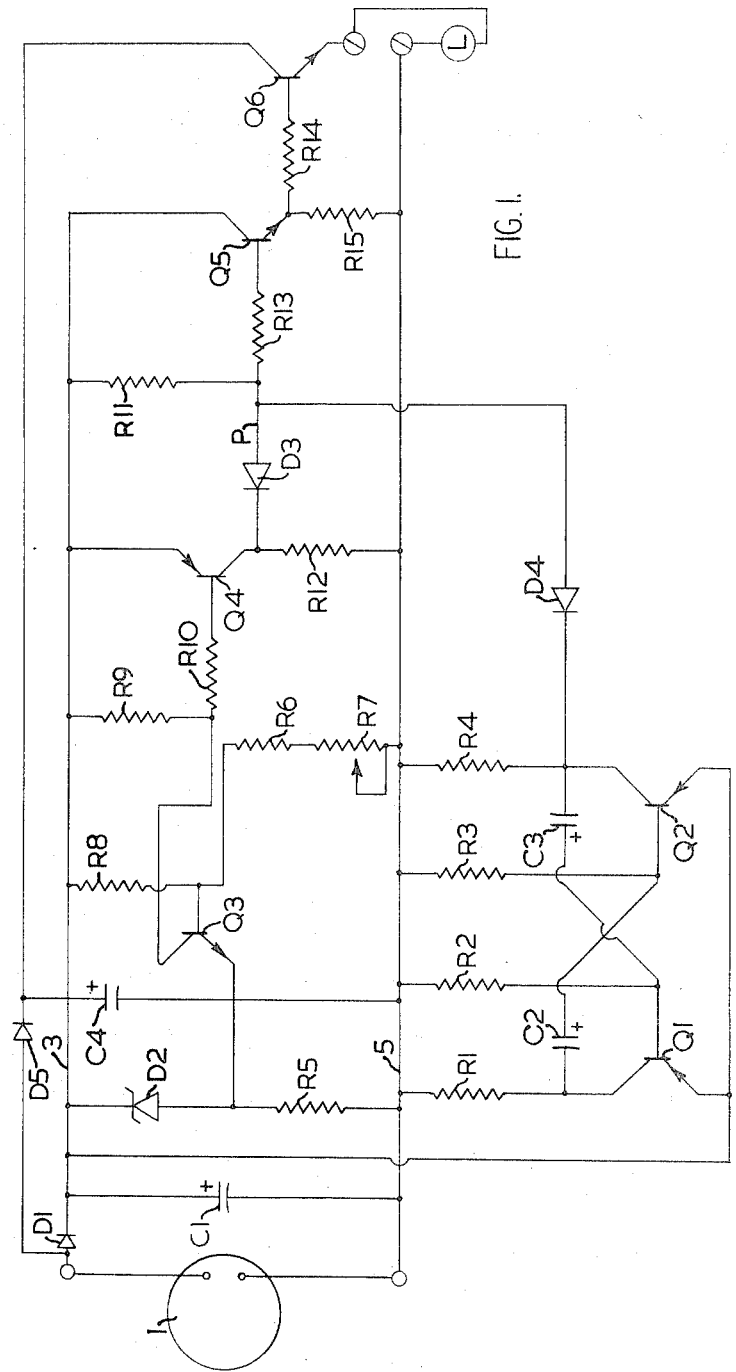
FIG. 1 is a circuit diagram of a braking warning system for a vehicle such as a snowmobile.

A variable-output-voltage rotary generator 1 is coupled directly to the transmission system of the snowmobile or other vehicle so that its speed of rotation and thus its output voltage varies appreciably over the working range of speed of the snowmobile. This generator 1 can be an additional device fitted to the existing snowmobile and driven by the endless driving track, the drive to that track, or by the motor which drives the track. However, in many cases it is possible to make use of an electrical generator or device already provided on the snowmobile for other purposes. The arrangement will differ with the type of snowmobile involved. For example, in some cases the voltage from the low voltage side of an ignition magneto may be used; in others, a flywheel magneto will also include a "lighting" which can be used as the said source of voltage. In still other vehicles, a direct current generator or an alternator may be used. It is important that the voltage generated by the device varies considerably with variation in speed. Thus, in the case of a generator or alternator having means for stabilizing its output voltage, the output from some form of electric tachometer, driven by the ignition pulses to the engine, or even the output from a solid-state ignition system, can be used, the output of such a device typically being proportional to the engine speed.

Whatever its source, the variable input voltage is applied between leads 3 and 5 through a diode D1 to a large capacitor C1 which smooths the voltage effectively before it is applied to a flasher unit which can be a conventional free running astable multibibrator circuit consisting of two transistors Q1 and Q2 and an arrangement of capacitors C2 and C3 and resistors R1, R2, R3 and R4.

The variable voltage is also applied to a measuring or control circuit which includes, among other items, the combination of a Zener diode D2 and resistor R5. By applying the variable voltage across diode D2 and resistor R5, a stable voltage is developed across the Zener diode D2 between the emitter of a further transistor Q3 and lead 3, but a variable voltage is developed across resistor R5 and dependent upon the input voltage, between emitter and base of that transistor. The actual emitter base bias applied to transistor Q3 is the algebraic sum of the bias voltage so produced across resistor R5 and the bias voltage developed across the series combination of a further fixed resistor R6 and a variable resistor R7, which are connected in series with a further fixed resistor R8 between leads 3 and 5. It will be seen that if the variable resistor R7 is set so that the transistor Q3 becomes non-conductive when the voltage between leads 3 and 5 is that corresponding to a predetermined low throttle setting, then as the engine speed increases above that speed the transistor Q3 will remain non-conductive, but at lower speeds Q3 will be brought into conduction.

The collector of transistor Q3 is connected through a resistor R9 to lead 3, and the voltage of the collector will fall (go more negative) when transistor Q3 goes into conduction. Through resistor R10 this drop in voltage is transmitted to the base of a transistor Q4, which is biased by this voltage so that it is non-conductive at high engine speed but becomes conductive when transistor Q3 goes into conduction. The voltage on the collector of transistor Q4 will rise nearly to that on lead 3 when the transistor is conducting, but will go more negative as the engine speed rises and transistors Q3 and Q4 go out of conduction. A point P in the circuit is connected through a diode D3 in the forward direction to the collector of transistor Q4, and through a diode D4 in the forward direction to the collector of transistor Q2.

Considering now the voltage at point P, since this point is on a voltage divider chain consisting of two resistors R11 and R12 and connected between leads 3 and 5, and with R11 being many times larger than R12, as will hereinafter be described, when transistor Q4 is non-conducting, the voltage of point P will be held down close to that of negative lead 5. On the other hand, if transistor Q4 is conducting, its collector will have a voltage approaching that of lead 3, and the diode D3 will be back-biased. The voltage at point P is then controlled by the voltage drops over resistors R11 and R4, which effectively are in series between leads 3 and 5. Under a first condition, when transistor Q2 is non-conducting, with R4 being much smaller than R11, the point P will have a potential approaching that of lead 5. Under the reverse condition, when the transistor Q2 is conducting, its collector voltage will rise, approaching that of lead 3, and in sympathy the potential of point P will rise toward that of lead 3. Thus the pulse-like output from the flasher unit appears at point P only when transistor Q4 is conducting.

The net result is that at low engine speeds with Q4 conducting the multivibrator circuit will be operating, and the point P will experience the output pulses. At higher speeds, (transistor Q4 not conducting), the pulse-like output from the multivibrator will not appear at point P because as a result of the gating of the measuring circuit, the voltage at point P is approaching that on line 3. Under these circumstances, at low engine speeds only, a transistor Q5 is switched on and off in time with the multivibrator, and this drives a power transistor Q6 which causes a lamp L, energized by transistor Q6, to blink or flash in time with the flasher unit. A diode D5 and capacitor C5, in a conventional configuration, rectify and filter the A.C. output from the signal generator 1 so as to provide a voltage source for the power transistor Q6. Two resistors R13 and R14 limit the current to the bases of transistors Q5 and A6, respectively, and R15 represents the inpedence for the emitter circuit of Q5.

While the precise values of the various circuit components are not critical to this invention, the operation of the circuit shown in the manner described is best carried out by the preferred parameters for the components which are listed and specified below:

TRANSISTORS

| Q1 | pnp | type | BC418A |
| Q2 | pnp | type | BC418A |
| Q3 | npn | type | BC408A |
| Q4 | pnp | type | BC418A |
| Q5 | npn | type | BC408A |
| Q6 | npn | type | 2N3054 |

DIODES

D1 — IN2070
D2 — Zener 82X-79C5
D3 — IN64A
D4 — IN64A
D5 — IN2070

CAPACITORS

C1 — 1000 microfarads 16 volts
C2 — 20 microfarads
C3 — 20 microfarads
C4 — 100 microfarads

RESISTORS

R1 — 1,500 ohms
R2 — 22,000 ohms
R3 — 22,000 ohms
R4 — 1,500 ohms
R5 — 270 ohms
R6 — 1,000 ohms
R7 — 5,000 ohms
R8 — 1,000 ohms
R9 — 360 ohms
R10 — 360 ohms
R11 — 22,000 ohms
R12 — 1,500 ohms
R13 — 270 ohms
R14 — 270 ohms
R15 — 1,500 ohms During use of the snowmobile fitted with the system shown in FIG. 1, since the system is energized by the output from the vehicle generator or some other electrical system having an output which depends upon the speed at which the vehicle engine is running, no ON/OFF switch is required; when the engine is not running, the system is not energized.

Once the engine has been started, a relatively low voltage will appear between leads 3 and 5, and as long as it is above a minimum level, the multivibrator forming the flasher unit will commence to operate and the voltage at point P will be permitted by the measuring circuitry to vary similarly so that lamp L will commence to flash on and off in time with the flasher unit. This serves as a warning to any adjacent snowmobile that the engine of the snowmobile is running. Although this may be apparent to any bystander, to another snowmobile driver subjected to the noise from his own engine, it is not always obvious.

As long as the engine speed remains below a certain speed preselected determined by the adjustment of the resistor R7 of the measuring circuitry, transistors Q3 and Q4 will be conductive, and diode D3 will remain back-biased. However, once that speed is exceeded, the voltage developed across resistor R5 becomes sufficient to cause transistor Q3 to cease conducting. The rise in the collector voltage of this transistor Q3, being applied to the base of transistor Q4, renders that transistor nonconductive. The voltage of the collector of transistor Q4 then drops sharply from a level close to that of lead 3 down to a level close to that of lead 5. Diode D3 is, of course, then conductive. The potential of point P is therefore held close to that of lead 5, and the pulses from the multivibrator cease to have any appreciable effect on the potential at point P. The transistor Q5 then ceases to switch on and off in accordance with the multivibrator pulses, and ceases to drive the power transistor Q6 in a similar manner to control the intermittent energization of the lamp L.

During normal operation of the snowmobile, the lamp L therefore does not flash. However, if the driver releases his throttle control or its equivalent, his engine speed commences to drop, and long before any change in speed is apparent to an observer, the voltage between leads 3 and 5 will have reached a level at which transistor Q3 commences to conduct. Once this happens, the circuit quickly reverts to its original state, and the potential of point P becomes unlocked from that of lead 5 by the measuring of gating circuitry, permitting the pulses of the still running multivibrator to reach the transistor Q5, so that the lamp L commences to flash. It will thus be seen that release or closure of the throttle control through energization of the lamp L provides an early warning to a following driver that braking is taking place.

Figure 2:
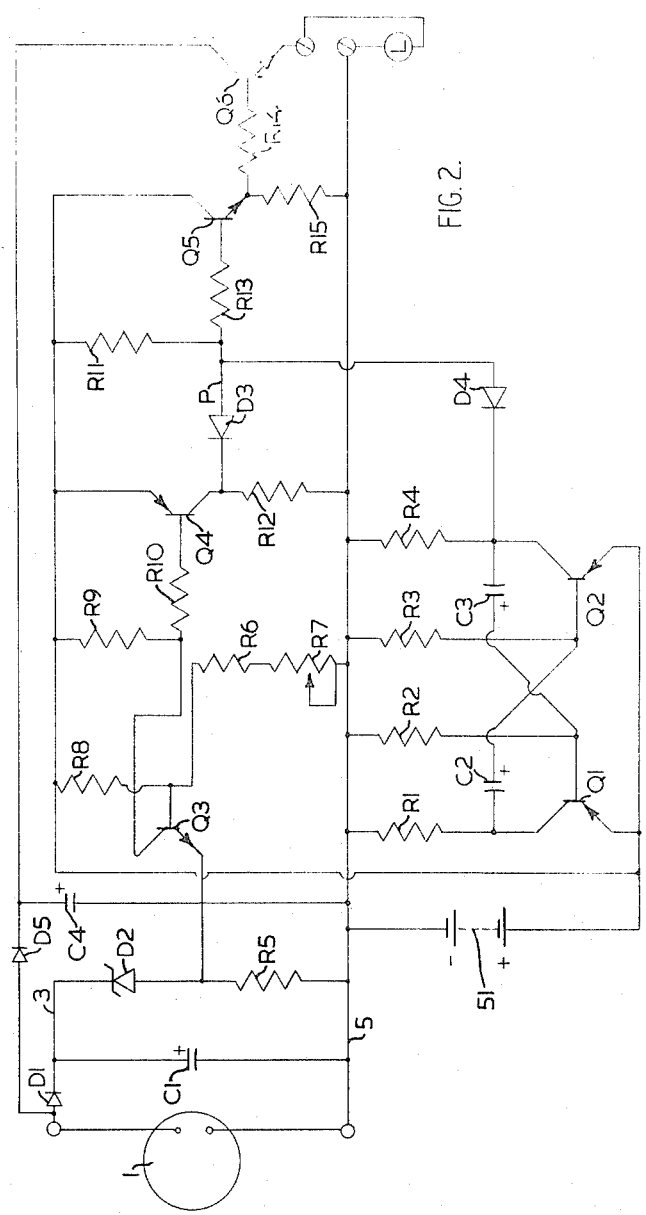
FIG. 2 is a circuit diagram of a modification of the system of FIG. 1.

Referring now to FIG. 2, this shows an arrangement which can be used when the source of the control voltage is a low current source insufficient to operate the lamp L. It will be seen that the circuit is generally similar to the circuit of FIG. 1, but an auxiliary source of d.c. power 51, such as a storage battery of the snowmobile, is used to power the portion of the circuit requiring an appreciable current supply, and the input or control voltage being used merely to provide the component bias voltage for transistor Q3 which is developed across resistor R5. By some such arrangement, use can be made of a low-current speed-indicative voltage source.

Figure 3:
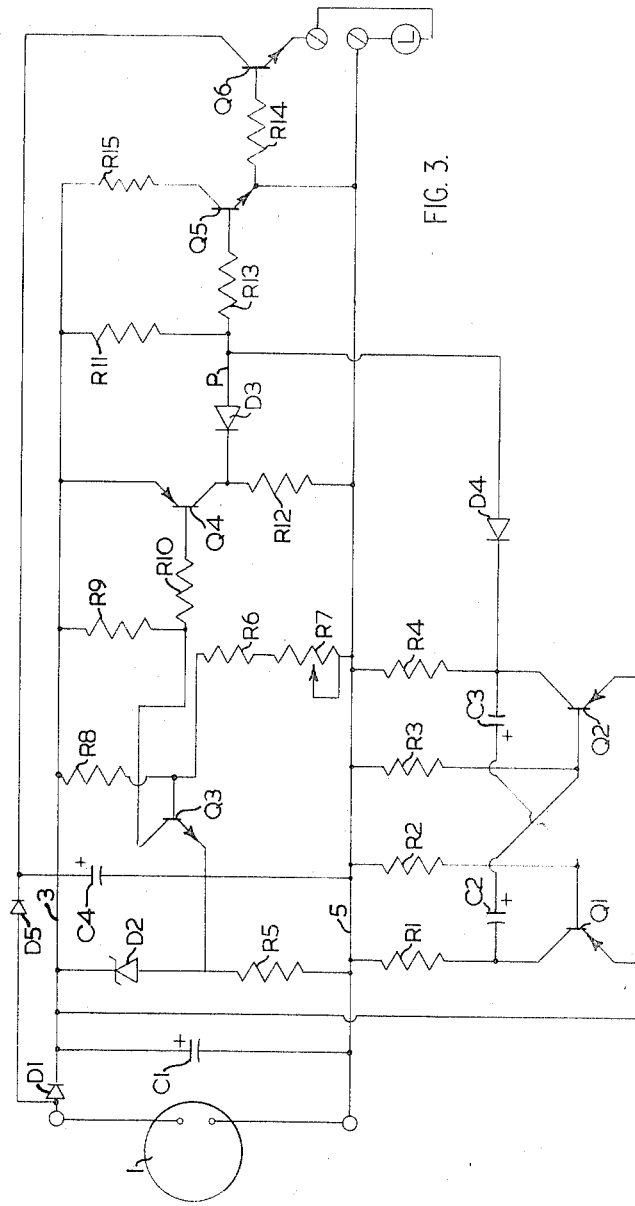
FIG. 3 is a circuit diagram similar to that of FIG. 1 but modified to provide an alternative form of warning signal.

The circuit shown in FIG. 3 is basically the same as that shown in FIG. 1, but the resistor R15 is transferred from the emitter circuit of Q5 to the collector of Q5. As is evident to one skilled in the art, R15 therefore acts as a load resistor and effectively eliminates the effect of transistor Q5 so that the lamp is on during periods of relatively high speed operation. However, the lamp will still flash during periods of braking due to the connection of the multivibrator circuit.

As previously described, the present invention finds particular application to snowmobiles, in which engine braking is widely used, but on the other hand the invention can be applied more generally. Thus, even in the case of the ordinary automobile, a similar system could be added to the existing brake warning light system to provide an indication of slowing whenever the engine speed is reduced below a predetermined magnitude. In view of the use of multi-speed gearboxes in automobiles, it will probably be necessary to limit the operation of the device to certain speed ranges, and in order to avoid conflict with regulations relating to the use of flashing lights for the indication of turns and the indication of disablement of the vehicle, it may be necessary to use a non-flashing light.

Figure 4:
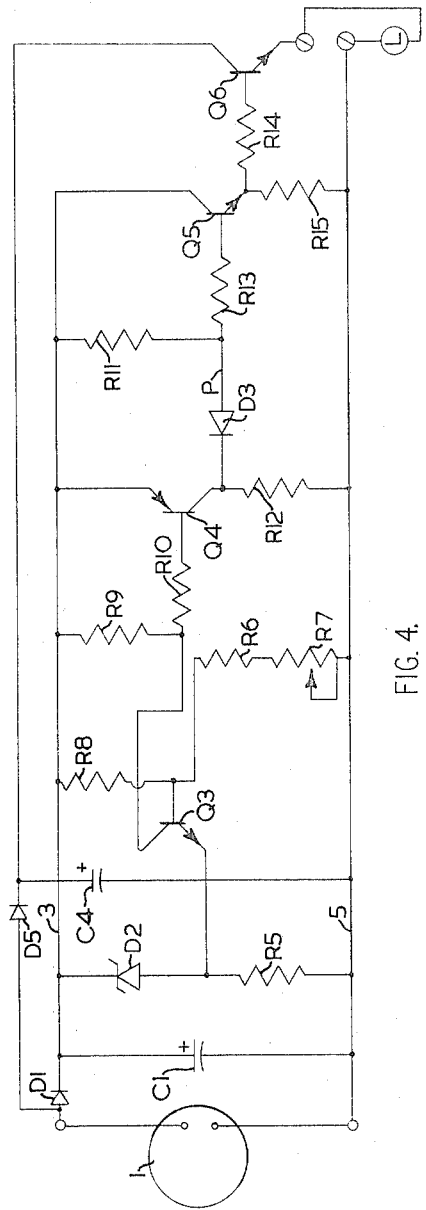
FIG. 4 is a circuit diagram of a modification of the circuit of FIG. 1.

Such a system is shown in FIG. 4, in which the flashing facility is left out and the lamp is out during normal operation, but comes on as a steady light during braking of the vehicle. Such a system lends itself to inclusion in the braking system of an ordinary road vehicle, since it can be used either to energize the normal brake lights (supplementing the indication given by the braking switch associated with the vehicle brake pedal) or to energize an additional stopping lamp.

The circuit of FIG. 5 is similar to that of FIG. 2, in that it provides for the use of a control voltage from a low current source, and similar to that of FIG. 3 in the location of the resistor R15, this new position of the resistor causing the lamp L to be on during periods of relatively high speed operation but to flash during periods of braking.

From the foregoing it should be evident that a warning device constructed according to the concepts of the present invention and utilized with a land vehicle, such as a snowmobile, will vastly improve the braking signal art.

What is claimed is:

1. A visual warning system for engine driven land vehicles, comprising electrical signal generating means to produce a signal which varies in magnitude in accordance with the speed of the engine driving the vehicle, a control circuit receiving said signal from said generating means, a signaling circuit receiving said signal from said generating means and continually providing an output signal, a signaling device capable of providing a visual warning to following vehicles, and means for actuating said signaling device, said control circuit including transistor means capable of conductive and non-conductive states and receiving said signal from said generating means, and means to selectively control the point at which said transistor means conducts dependent on the magnitude of said signal from said generating means, said means for actuating said signaling device being inoperative during said non-conductive state of said transistor means and receiving said output signal of said signaling circuit during said conductive state of said transistor means so that said warning signal is actuated when the engine speed falls below a predetermined speed as set by said means to selectively control the point at which said transistor means conducts.

2. A warning system in claim 1, wherein the electrical signal generating means is a rotary electrical generator driven by the engine.

3. A warning system as in claim 1, wherein the engine is a spark ignition internal combustion engine and the electrical signal generating means is associated with a spark ignition system for the engine.

4. A warning system as in claim 1, wherein the said visual warning is in the form of a flashing light, and said signaling circuit is a flasher unit is arranged continuously to alternate between "on" and "off" states.

5. A visual warning system as in claim 4, wherein the electrical signal generating means is a rotary generator driven by said engine.

6. A visual warning system as in claim 5, wherein said flasher unit is a solid state multivibrator circuit.

7. A visual warning system as in claim 1, wherein the vehicle is a snowmobile.

8. A visual warning system as in claim 1, wherein said means to selectively control the point at which said transistor means conducts includes a variable resistor.

9. A visual warning system as in claim 4, wherein said means for actuating said signaling device includes a power transistor.

10. A visual warning system as in claim 5 wherein said signaling device includes a lamp.

* * * * *